United States Patent [19]

Viracola

[11] Patent Number: 5,354,215
[45] Date of Patent: Oct. 11, 1994

[54] CIRCUIT INTERCONNECT FOR A POWER TOOL

[76] Inventor: Joseph R. Viracola, 11120 Queensland, #B-17, Los Angeles, Calif. 90034

[21] Appl. No.: 82,232

[22] Filed: Jun. 24, 1993

[51] Int. Cl.⁵ .............................................. H01R 3/00
[52] U.S. Cl. .................................... 439/500; 310/50; 320/2
[58] Field of Search .................. 439/34, 500, 568, 141, 439/677; 310/50; 320/2

[56] References Cited

U.S. PATENT DOCUMENTS

| | | | |
|---|---|---|---|
| 3,823,367 | 7/1974 | Kaye et al. | 439/677 X |
| 4,835,410 | 5/1989 | Bhagwat et al. | 320/2 |
| 4,872,230 | 10/1989 | Levine | 310/50 |
| 4,969,834 | 11/1990 | Johnson | 439/191 |

FOREIGN PATENT DOCUMENTS 2225178  5/1990  United Kingdom ................ 439/500

Primary Examiner—Eugene F. Desmond
Attorney, Agent, or Firm—Macro-Search Corp.

[57] ABSTRACT

A circuit interconnecting device for a power tool of the type having a compartment for a replaceable battery is provided. A base is adapted for mounting in the battery compartment. The base receives one end of a power cord and includes an extension that has a proximal end adapted for plug-in engagement with the base, and a distal end adapted for electrical interconnection with a pair of electrical contacts of the power tool. A power cord has at one end a plug for electrical interconnection with a power source socket, and at the other end is adapted for engagement with the base, such that an electrical interconnection between the power cord and the distal end of the extension is provided. A cover is mounted and slidably engaged with the extension in such a manner that the cover may be moved to expose contact surfaces of the distal end of the extension or to cover the contact surfaces to prevent electrical shock when the device is removed from the power tool. The base only fits into the bakery compartment in a preferred orientation to assure proper polarity of the device when inserted into the power tool.

8 Claims, 5 Drawing Sheets

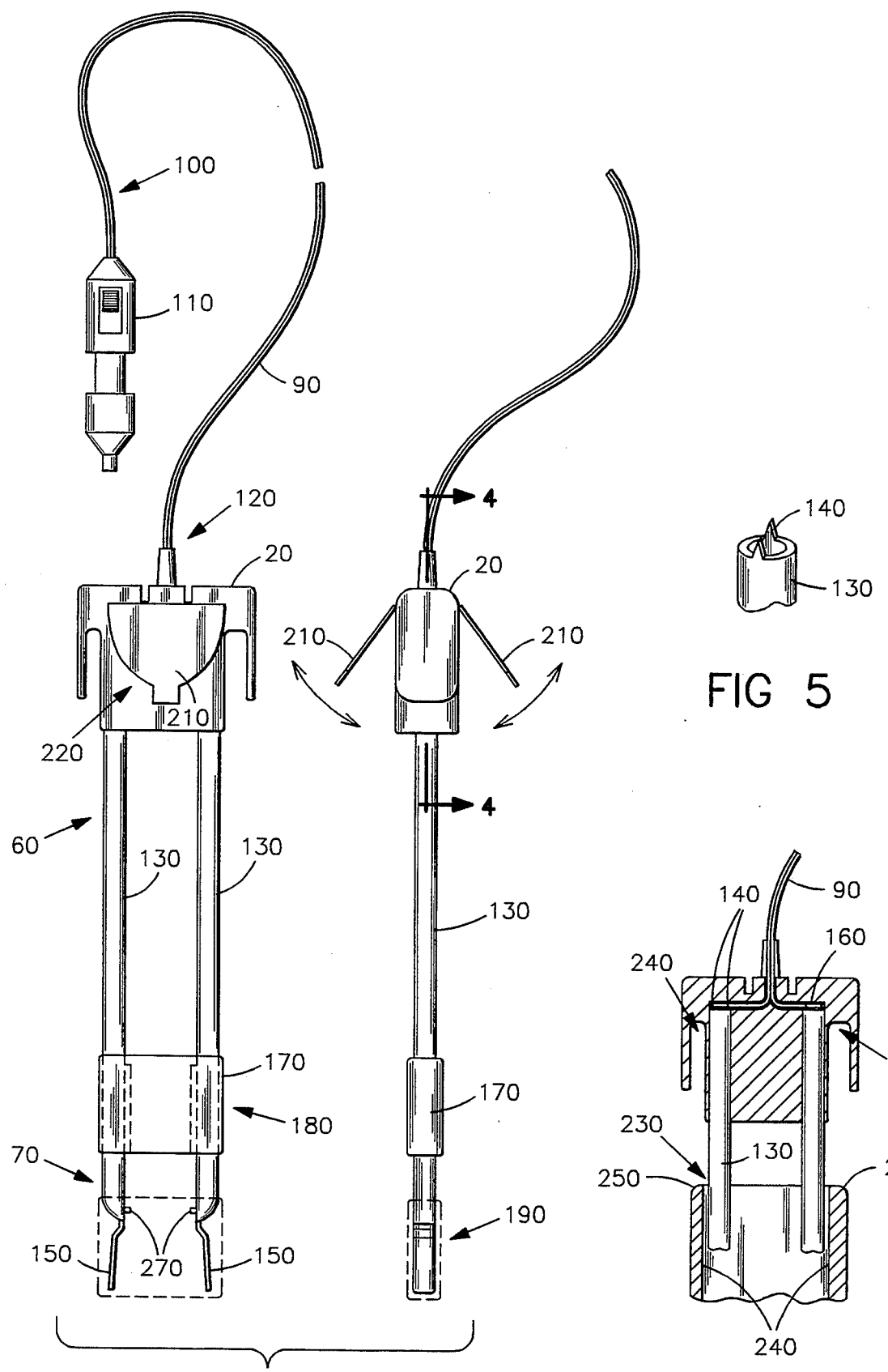

CIRCUIT INTERCONNECT FOR A POWER TOOL

FIELD OF THE INVENTION

This invention relates generally to electrical adapters, and, more particularly, is directed towards an electrical power interconnection device for a battery operated power tool.

BACKGROUND OF THE INVENTION

It is well known that battery packs that provide power to portable, battery-operated power tools have the drawback of short battery life, especially when the power tool is used often or is heavily loaded. Consequently, users of such power tools are often required to replace a discharged battery pack for either a new battery pack or a recharged battery pack. Such battery packs are relatively expensive to purchase and require a fair amount of time to recharge. Further, rechargers for such battery packs are also fairly expensive.

Welch, in his U.S. Pat. No. 5,076,805 issued on Dec. 31, 1991, recognized the inherent drawbacks with such battery-operated tools. Welch teaches an adapter that replaces the battery pack of such tools and connects to a vehicle battery with a pair of power cables. No provision is made in the Welch device, however, for protectively insulating the electrodes of the device when the device is removed from the battery compartment of the power tool. If such a device is removed from the power tool and inadvertently placed in, for example, a tool box, the electrical contacts can short circuit. Such an occurrence could cause considerable damage to the vehicle battery, especially since, as disclosed, the Welch device connects directly to the battery leads without any intervening fuse means. If in an environment with explosive fumes, a spark caused by such shorting of the electrical contacts can ignite such fumes inadvertently. Further, no provision is made in the Welch device for assuring the correct battery polarity when the device is inserted into the power tool. Depending upon the type of power tool used, a reversed battery polarity can cause the power tool to function incorrectly. Moreover, the connector described in the Welch device is awkward to use, since one must expose the vehicle battery leads, typically by lifting the hood of the vehicle, during use.

Clearly, then, there is a need for an interconnecting power adapter for a power tool that protects and insulates its electrical contacts when not engaged with a power tool. Such a needed device would ensure proper battery polarity when inserted into the power tool, and would have an improved vehicle battery connector means. Further, such a needed device would be relatively inexpensive to manufacture and assemble, allowing for a press-fit assembly of relatively few components. The present invention fulfills these needs and provides further related advantages.

SUMMARY OF THE INVENTION

The present invention is a circuit interconnecting device for a power tool of the type having a compartment for a replaceable battery. A supporting base is adapted for mounting in the entry lip of a battery compartment and includes an internal power cord receiving channel and extension receiving channels. The base includes an asymmetrical engagement formation that mates with the entry lip of the battery compartment for assuring proper polarity of the device when the device is inserted into the battery compartment. An extension of the base extends from the base and, at a distal end, is adapted for electrical interconnection with a pair of electrical contacts of the power tool. A power cord has at one end a plug for electrical interconnection with a power source, such as the cigarette lighter of a vehicle, and at the other end is adapted for engagement with the base. A cover is slidably mounted on the extension in such a manner that the cover may be moved to expose contact surfaces of the distal end of the extension or to cover the contact surfaces in order to prevent electrical shock when the device is removed from the power tool.

The present device is an interconnecting power adapter for a power tool that protects and insulates its electrical contacts when not inserted into a power tool. Further, the present invention ensures proper battery polarity when inserted into the power tool, and has an improved, more conveniently used vehicle battery connector. Further, the present device is relatively inexpensive to manufacture and assemble, and allows for a press-fit assembly of relatively few components. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is both a top plan view and a right side elevational view of the invention, illustrating a pair of parallel, spaced apart conductors of an extension means of the invention and, in phantom outline, a second cover position of a cover means of the invention;

FIG. 4 is a cross-sectional view of the invention, taken generally along line 4—4 of FIG. 3, and illustrating a power cord receiving means and an extension means receiving means of the base means of the invention;

FIG. 5 is a partial perspective illustration of a proximal end of one conductor, illustrating a penetrating means thereof;

DETAILED DESCRIPTION OF THE PREFERRED EMBODIMENT

Figures 1, 1A:
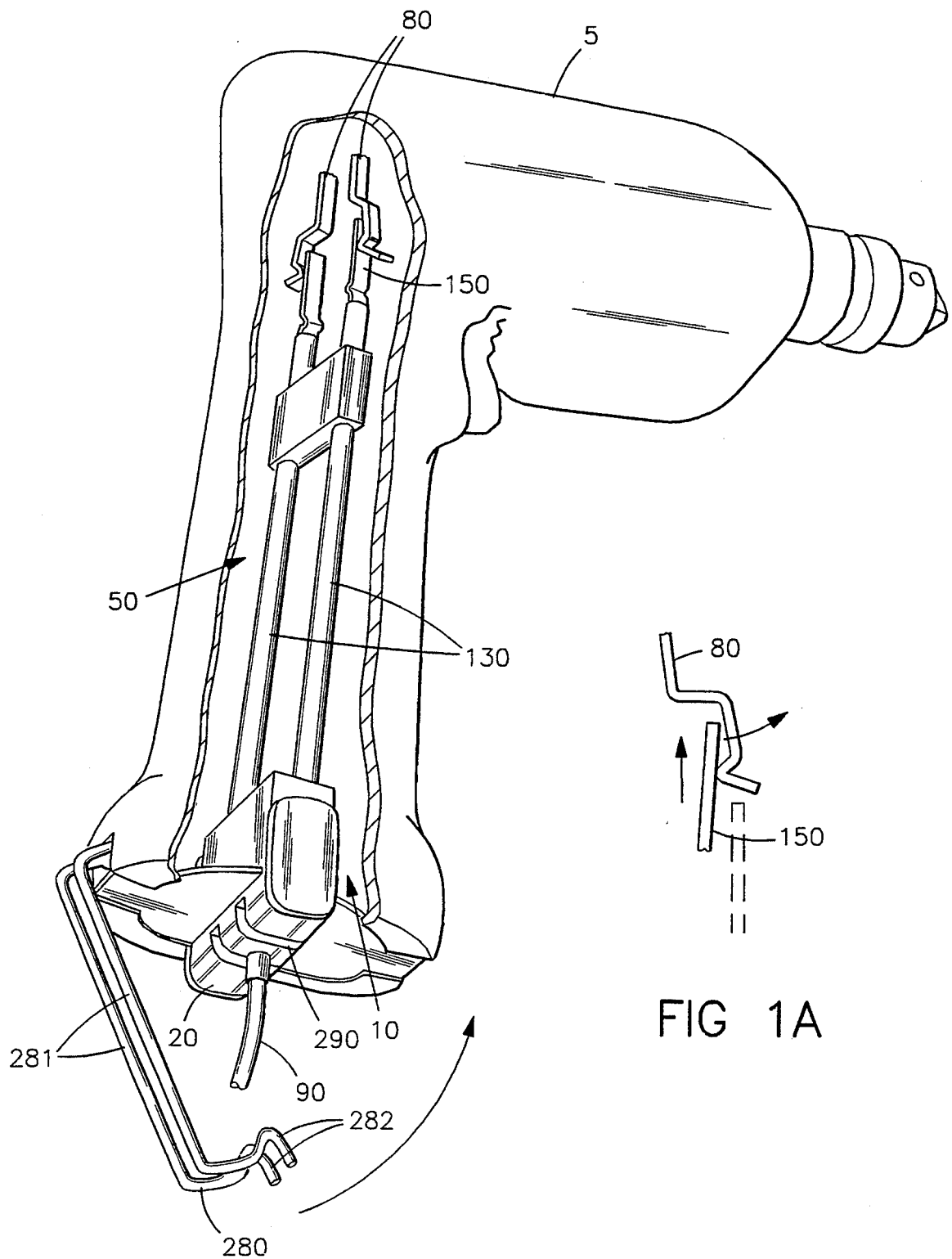
FIG. 1 is a perspective view, partially broken away, of a power tool, illustrating the interconnecting device of the present invention fully inserted into a battery compartment thereof.
FIG. 1A is a partial top plan view of the invention, illustrating a contact surface of the invention in contact with a resilient electrical contact of the power tool.

FIG. 1 illustrates a circuit interconnecting device for a power tool 5 of the type having a compartment 10 for a replaceable battery. A base means 20 is adapted for mounting in the battery compartment 10 and includes a power cord receiving means 30 and an extension means receiving means 40. The base means 20 is manufactured from any suitably rigid, electrically insulating material, such as plastic.

Figure 2:
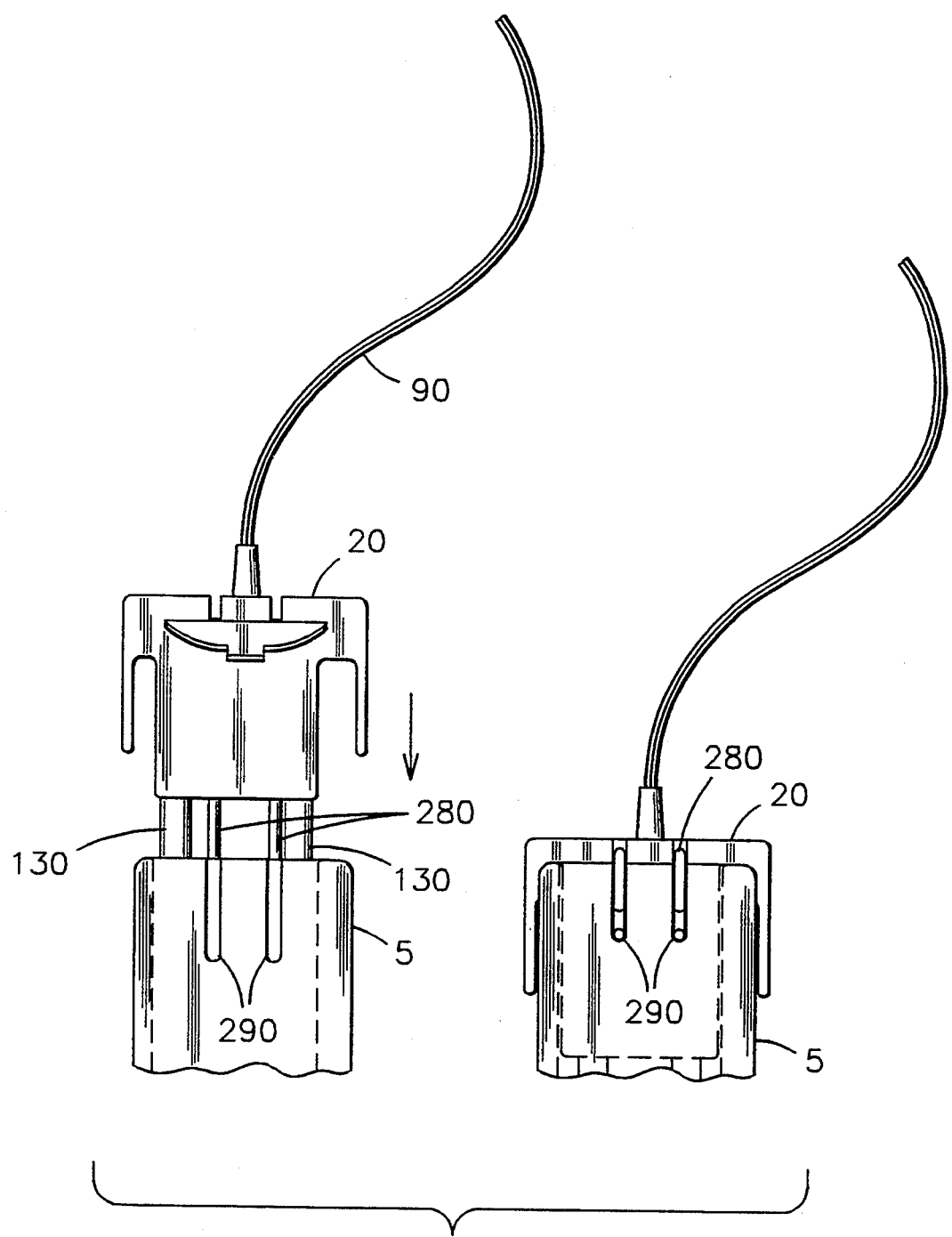
FIG. 2 is a partial top plan view of the invention, illustrating a base means of the invention before and after insertion into the battery compartment of the power tool.

Preferably, the base means 20 includes a closure means 210 hingably attached to the base means 20 (FIGS. 1 and 3). The closure means 210 has a complimentary shape 220 to that of an opening 230 of the battery compartment 10 such that the base means 10 and the closure means 210 together seal the opening 230 of the battery compartment 10 when the device is fully inserted into the battery compartment 10. The closure means 210 may also be folded to lay flush against the base means 20 for compact storage of the device. A retaining clip 280 of the power tool 5 has a pair of parallel wire legs 281 which engage a pair of grooves 290 respectively the base means 20 for retaining the device in the battery compartment 10 (FIGS. 1 and 2). The legs 281 span the battery compartment opening 230 and each terminates with a U-shaped prong 282 formed and positioned to engage the power tool 5, for holding the clip in the closed orientation. Such a clip 280 may be readily installed on a power tool 5 by removing, if necessary, a closure cap thereof (not shown) that is typically included with such power tools 5. Further, the base means 20 preferably includes power tool asymmetrical engagement means 240 for engaging an asymmetrical receiving means 250 of the battery compartment 10 (FIGS. 2 and 4). The engagement means 240 is engagable with the receiving means 250 only when the device is inserted into the battery compartment 10 in a preferred orientation. The engagement means 240 prevents full insertion of the device into the battery compartment 10 when the device is not in the preferred orientation. As such, proper polarity of the device when inserted into the battery compartment 10 is assured.

An extension means 50 has a proximal end 60 and a distal end 70. The proximal end 60 is adapted for plug-in engagement with the extension means 40, and the distal end is adapted for electrical interconnection with a pair of electrical contacts 80 of the power tool 5 (FIG. 1A). The electrical contacts 80 of the power tool 5, which are somewhat resilient, tend to bend away from each other to accommodate the extension means 50. The proximal end 60 and the distal end 70 are electrically interconnected.

A power cord 90 is included, having at one end 100 a plug 110 for electrical interconnection with a power source socket, such as a cigarette lighter socket of a vehicle. The other end 120 of the power cord 90 is adapted for engagement with the power cord receiving means 30 of the base means 20 such that engagement of the proximal end 60 of the extension means 50 with the extension means receiving means 40 provides electrical interconnection between the power cord 90 and the proximal end 60 of the extension means 50. As such, the device may be inserted into the battery compartment 10 of the power tool 5 to provide power from the power source socket to the power tool electrical contacts 80.

Preferably, the extension means 50 is a pair of parallel, spaced apart, rigid conductors 130 each having an insulation penetrating means 140 (FIG. 5) at the proximal end 60 and an electrical contact surface 150 at the distal end 70. The base means 20, in such a preferred embodiment, includes an internal channel means 160 for receiving the other end 120 of the power cord 90 such that the power cord 90, when inserted into the channel means 160, is positioned for penetration by each of the insulating penetrating means 140 upon insertion of the extension means 50 into the base means 20 (FIG. 4). As such, power is supplied from the power source socket to the contact surfaces 150 of each rigid conductor 130, and an electrical circuit between the power source socket and the power tool 5 may be completed.

Figure 8:
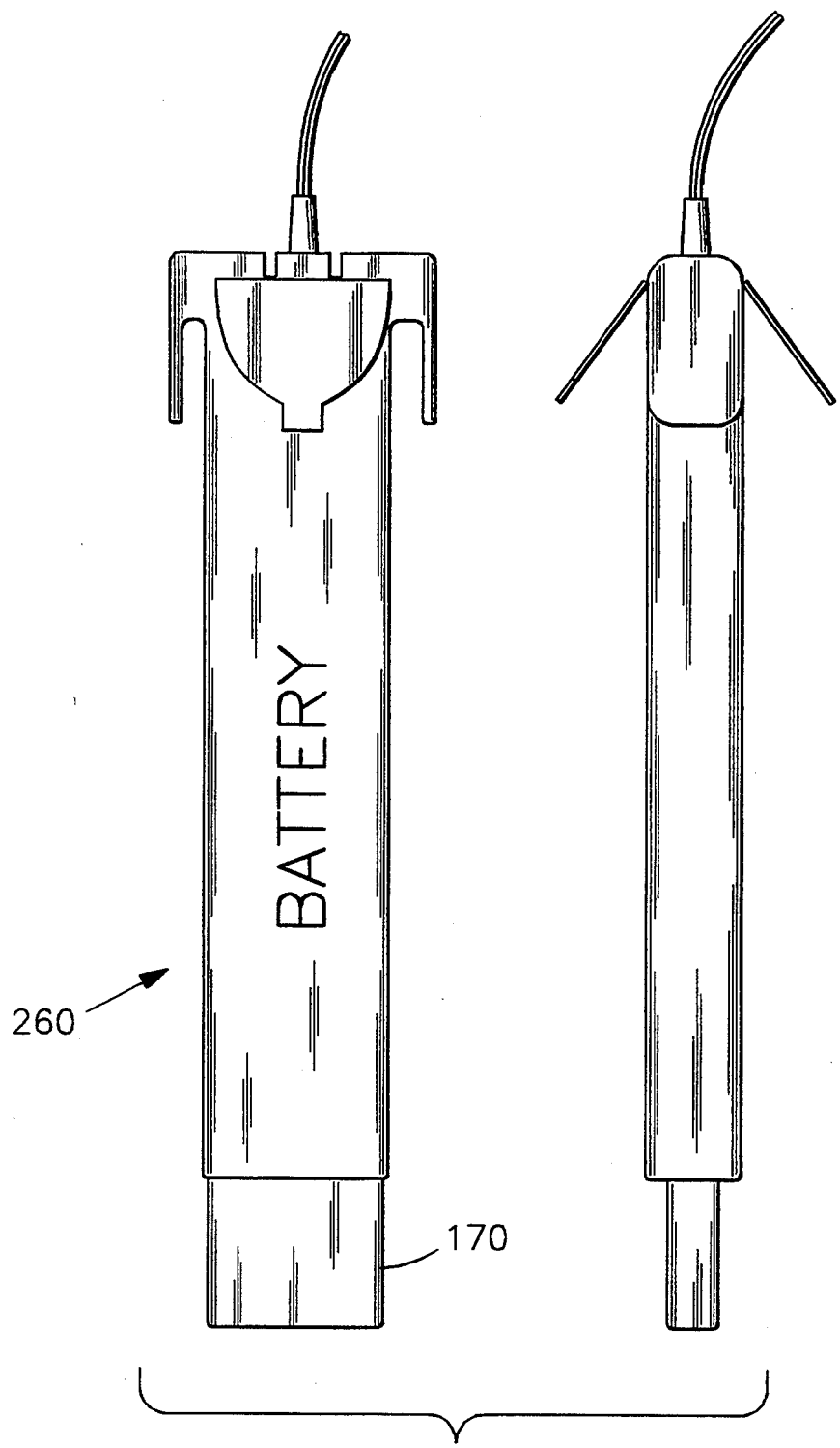
FIG. 8 is both a top plan view and a right side elevational view of an alternate embodiment of the invention, wherein the invention is shaped to appear similar to a replaceable battery of the power tool.

In one embodiment of the invention, illustrated in FIG. 8, the extension means 50 has a shape 260 resembling the replaceable battery such that the device appears to be similar to the replaceable battery.

Figure 7:
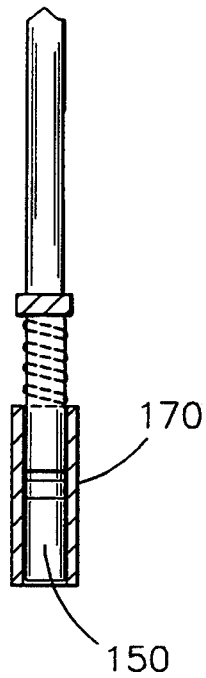
FIG. 7 is a cross-sectional view of the invention, taken generally along lines 7—7 of FIG. 6, and illustrating the contact surface at a distal end of the conductor and the cover means in the second cover position.
Figure 6:
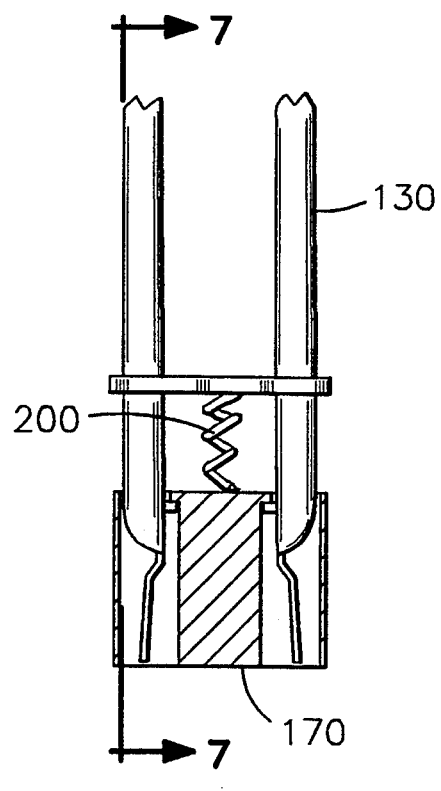
FIG. 6 is a partial top plan view of the invention, illustrating an urging means urging the cover means into the second cover position.

A cover means 170 may also be included, mounted and slidably engaging the pair of rigid conductors 130 in such a manner that the cover means 170 may be moved to a first cover position 180 (FIG. 3) for exposing the contact surfaces 150 of the conductors 130 when the device is inserted into the battery compartment 10. Similarly, the cover means 170 may be moved to a second cover position 190 for covering the contact surfaces 150 to prevent electrical shock when the device is removed from the power tool 5. Such a cover means 170 is formed from an electrically insulating material, such as plastic. An urging means 200, such as a spring, may be included for urging the cover means 170 toward the second cover position 190 upon withdrawal of the device from the power tool 5 (FIGS. 6 and 7). A pin 270 on each conductor 130 prevents the cover means 170 from being removed from the extension means 50 (FIGS. 3 and 6). The cover means 170 may be further adapted so as to fit into guide channels of the battery compartment 10 for guiding the extension means 50 towards the electrical contacts 80 of the power tool 5.

While the invention has been described with reference to a preferred embodiment, it is to be clearly understood by those skilled in the art that the invention is not limited thereto. Rather, the scope of the invention is to be interpreted only in conjunction with the appended claims.

I claim:

1. A circuit interconnecting device for a power tool of the type having a compartment for a replaceable battery, the device comprising:

a base means adapted for mounting in the battery compartment including power cord receiving means, and extension means receiving means, the base means including power tool asymmetrical engagement means for engaging an asymmetrical receiving means of the battery compartment, said engagement means being engagable with said receiving means only when the device is inserted into the battery compartment in a preferred orientation and otherwise preventing the full insertion of the device into the battery compartment;

an extension means, having a proximal end and a distal end, the proximal end adapted for plug-in engagement with the extension means receiving means, the distal end adapted for electrical interconnection with a pair of electrical contacts of the power tool, the proximal and distal ends being in electrical communication;

a power cord including, at one end, a plug for electrical interconnection with a power source socket, the other end adapted for engagement with the power cord receiving means of the base means such that engagement of the proximal end of the extension means with the extension means receiving means provides electrical interconnection between the power cord and the proximal end of the extension means whereby the device may be inserted into the battery compartment of the power tool to provide power from the power source socket to the power tool electrical contacts.

2. The circuit interconnecting device for a power tool of claim 1 wherein the base means includes closure means hingably attached to the base means, the closure means having a complimentary shape to an opening of the battery compartment such the base means and the closure means together seal the battery compartment opening, when the device is fully inserted into the battery compartment, the closure means being foldable to lay flush against the base means for storage.

3. The circuit interconnecting device for a power tool of claim 1 wherein the extension means has a shape resembling the replaceable battery providing improved ease of use.

4. The circuit interconnecting device for a power tool of claim 1 wherein the extension means has a shape conforming to the battery compartment so that the device is conformably supported within the compartment.

5. The circuit interconnecting device for a power tool of claim 1 further including in combination, a retaining clip hingably attached to the battery compartment adjacent to the battery compartment opening, the clip including a pair of parallel wire legs spanning the opening, each of the legs terminating in a U-shaped prong formed and positioned to engage the power tool for holding the clip in place thereagainst in a closed position for retaining the device within the battery compartment, the retaining clip being further positionable in an open position for removal of the device from the compartment.

6. The circuit interconnecting device for a power tool of claim 1 wherein the extension means is a pair of parallel, spaced apart, rigid conductors each having an insulation penetrating means at the proximal end thereof and an electrical contact surface at the distal end, and wherein the base means includes an internal channel means for receiving said other end of the power cord, such that the power cord, when inserted into the channel means is positioned for penetration by each of the insulation penetrating means upon insertion of same into the base means to complete an electrical circuit between the power source socket and the power tool.

7. The circuit interconnecting device for a power tool of claim 6 further including a cover means mounted over and slidably engaging the pair of rigid conductors such that the cover means may be moved to a first cover position for exposing the contact surfaces when the device is inserted into the power tool, and may be moved to a second cover position for covering the contact surfaces to prevent electrical shock when the device is removed from the power tool.

8. The circuit interconnecting device for a power tool of claim 7 further including urging means for positioning the cover means to the second cover position upon withdrawal of the device from the power tool.

* * * * *